United States Patent
Jordan

(10) Patent No.: US 11,465,671 B2
(45) Date of Patent: Oct. 11, 2022

(54) METHOD FOR THE PRODUCTION OF ELECTRIC POWER STEERING SYSTEMS AS WELL AS AN ELECTRIC POWER STEERING SYSTEM

(71) Applicant: TRW Automotive GmbH, Alfdorf (DE)

(72) Inventor: Martin Jordan, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 387 days.

(21) Appl. No.: 16/686,569

(22) Filed: Nov. 18, 2019

(65) Prior Publication Data
US 2020/0156697 A1    May 21, 2020

(30) Foreign Application Priority Data
Nov. 19, 2018 (DE) .......................... 102018129061.6

(51) Int. Cl.
| B62D 5/04 | (2006.01) |
| F16H 19/02 | (2006.01) |
| F16H 57/021 | (2012.01) |

(52) U.S. Cl.
CPC ........... B62D 5/0409 (2013.01); F16H 19/02 (2013.01); *F16C 2326/24* (2013.01); *F16H 2057/0213* (2013.01)

(58) Field of Classification Search
CPC ...... B62D 5/04; B62D 5/0403; B62D 5/0409; F16H 19/02; F16H 2057/0213; F16C 2326/24
See application file for complete search history.

(56) References Cited

U.S. PATENT DOCUMENTS

| 2004/0245040 A1* | 12/2004 | Eda ........................ F16H 57/021 180/444 |
| 2005/0205341 A1* | 9/2005 | Kitahata ............... C10M 149/20 180/444 |
| 2011/0017542 A1* | 1/2011 | Kim ....................... F16C 27/066 180/444 |
| 2014/0041475 A1* | 2/2014 | Ko ........................ B62D 5/0472 74/427 |
| 2018/0195602 A1* | 7/2018 | Segawa .................. F16C 23/084 |
| 2019/0277385 A1* | 9/2019 | Diffin ...................... F16H 55/17 |

FOREIGN PATENT DOCUMENTS

EP            2722254 B1    11/2016

* cited by examiner

*Primary Examiner* — Tony H Winner
(74) *Attorney, Agent, or Firm* — Robert James Harwood

(57) ABSTRACT

A method to manufacture electric power steering systems is proposed. First, an electric motor having a drive shaft, a coupling device, and a worm gear having a worm shaft are provided. Then, an adjusting sleeve is provided, and an individual axial position of each adjusting sleeve in its associated opening is determined in order to achieve a specific axial preloading force on the worm shaft. The adjusting sleeve is press-fitted into the axial opening in the determined axial position, and a spring element is installed in the adjusting sleeve so that the spring element is supported on one end axially on the drive shaft and on its other end it is supported axially on the adjusting sleeve, and said spring element acts upon the worm shaft with the preloading force in the axial direction via the adjusting sleeve.

15 Claims, 2 Drawing Sheets

METHOD FOR THE PRODUCTION OF ELECTRIC POWER STEERING SYSTEMS AS WELL AS AN ELECTRIC POWER STEERING SYSTEM

CROSS-REFERENCE TO RELATED APPLICATION

This application claims priority to German Patent Application No. 102018129061.6, filed Nov. 19, 2018, the disclosure of which is incorporated herein by reference in its entirety.

TECHNICAL FIELD

The invention relates to a method for the production of electric power steering systems, as well as an electric power steering system.

BACKGROUND

The invention relates to a method for the production of electric power steering systems, as well as an electric power steering system.

Certain types of electric power steering systems, which are known from the prior art, comprise a worm gear via which an auxiliary motor of the electric power steering system is connected in a force-transmitting manner to a steering column (electric power steering system with a steering column support, in English often referred to as "EPS column drive") or to a pinion engaged with a rack of the electric power steering system (electric power steering system with a single pinion drive or double-pinion steering system, in English often referred to as "pinion drive EPS" or "dual pinion EPS").

A worm shaft of the worm gear is usually rotatably mounted on an end associated with the auxiliary motor by means of a fixed bearing. Between the worm shaft and a drive shaft of the auxiliary motor, a coupling device and a preloading device are provided, which connects the worm shaft to the drive shaft for transmitting torque or respectively a preloading force is applied in an axial direction to hold the worm shaft in the axial direction within a certain tolerance range.

In this case, typically, the coupling device acts upon the worm shaft with an axial force in a manner that the preloading force consists of at least two axial forces, exerted by the coupling device and the preloading device.

This preloading force must also be within a predefined tolerance range in each produced electric power steering system. Due to the large number of influencing parameters and components involved, a corresponding adjustment of the preloading force may be very expensive and/or complicated.

SUMMARY

Therefore, the object of the invention is to provide an electric power steering system that allows a simple adjustment of the preloading force.

The object is achieved according to the invention, by a method for the production of electric power steering systems, comprising the following steps: first, an electric motor having a drive shaft, a coupling device, and a worm gear having a worm shaft are provided, wherein the drive shaft and the worm shaft may be rotationally coupled together via the coupling device, and wherein the worm shaft, at its end associated with the electric motor, has an axial opening. Further, an adjusting sleeve is provided, and the individual axial position of each adjusting sleeve in its associated axial opening is determined to exert a specific axial preloading force on the worm shaft, i.e., the optimum position of the adjusting sleeve is individually calculated for each electric power steering system to be produced. The adjusting sleeve is press-fitted in the axial opening in the determined individual position, wherein there is a press fit between the adjusting sleeve and the worm shaft. A spring element is installed in the adjusting sleeve, so that the spring element on one end is supported axially on the drive shaft and on its other end it is supported axially on the adjusting sleeve, and the spring element acts upon the worm shaft with the preloading force in the axial direction via the adjusting sleeve.

The method according to the invention is based on the basic idea of transferring the adjustment of the preloading force as much as possible to a single easily adjustable element, formed here by the adjusting sleeve. The preloading force can be changed, in a particularly straightforward manner, by simply changing and adjusting the position of the adjusting sleeve in the axial direction. Accordingly, the preloading force is individually and easily adjusted for each electric power steering system to be produced.

There is a frictional connection between the adjusting sleeve and the worm shaft, wherein the force necessary to move the adjusting sleeve within the axial opening, must be greater than the force exerted by the spring element on the adjusting sleeve, so that the adjusting sleeve is not displaced unintentionally by the spring element. For example, the force for adjusting the adjusting sleeve is at least 25% greater than the spring force, preferably at least 50%, more preferably at least 100%.

Preferably, the worm shaft, the drive shaft, a housing of the worm gear, a housing of the electric motor, and/or the spring element are measured to determine the predefined position. The deviations of the individual components from the respective standard dimensions are significant. Particularly relevant in this context are the dimensions of the individual components in the direction that coincides with the axial direction of the worm shaft after assembling the electric power steering system. Based on the individual deviations of the individual components, the predefined individual position is then determined, in particular by combining the individual deviations to form a total deviation.

One aspect of the invention provides that the adjusting sleeve is pressed into the axial opening up to the predefined position, before the electric motor is connected to the worm gear. In other words, the tolerances of the individual components are already corrected before the electric power steering system is completely assembled.

The object is further achieved according to the invention by an electric power steering system, comprising an electric motor having a drive shaft, a coupling device, and a worm gear having a worm shaft. The drive shaft and the worm shaft relative to each other are rotatably coupled together via the coupling device, wherein the worm shaft, at its end associated with the electric motor, has an axial opening. The adjusting sleeve is press-fitted into the axial opening, wherein there is a press fit between the adjusting sleeve and the worm shaft. Additionally, a spring element is provided, which on one end is supported axially on the drive shaft and on its other end, it is supported axially on the adjusting sleeve, wherein the spring element acts upon the worm shaft with a preloading force in the axial direction via the adjusting sleeve. Regarding the advantages, please refer to the above explanations. In particular, the electric power steering system is produced by a method described above.

The worm shaft is rotatably mounted on its end associated with the electric motor by means of a fixed bearing, which is inserted into a housing of the worm gear and is fixedly connected thereto. The fixed bearing allows a limited pivoting movement of the worm shaft, but prevents lateral movement of the worm shaft parallel to its longitudinal axis.

At its opposite end away from the electric motor, the worm shaft is rotatably mounted by means of a floating bearing, which is pivotable to a limited degree together with the worm shaft. A maximum amplitude of the pivoting movement is chosen in a manner that the worm shaft always remains in engagement with a worm wheel of the worm gear.

According to one embodiment of the invention, the adjusting sleeve has an axial front wall on which the spring element is supported, in particular, wherein the axial front wall forms the portion of the adjusting sleeve located on the deepest part in the axial opening.

According to a further embodiment of the invention, the axial front wall has a passage opening. During the pressing of the adjusting sleeve, air located in an area between the axial front wall and a floor of the axial opening may escape through the passage opening. This results in a substantially constant force applied over the press-in path, which is necessary for pressing the adjusting sleeve. Without this passage opening, the air pressure would rise in the region between the axial front wall and the floor, and consequently, the necessary force over the press-in path would also rise. In particular, the adjusting sleeve is openly formed at one of the axial ends opposite the axial front wall.

Another aspect provides that the axial front wall is made of a noise-dampening material and/or is coated with a noise-damping material on one of the sides facing the drive shaft. This prevents disruptive noises that arise during the operation of the electric power steering system, caused by the fact that the end of the spring element associated with the adjusting sleeve moves towards the adjusting sleeve, and in doing so, may hit the adjusting sleeve.

Preferably, the adjusting sleeve has a circumferentially closed side wall, which extends in the axial direction of the adjusting sleeve and rests against an inner wall of the axial opening, in particular substantially against the entire surface. The shape and dimensions, in particular the base surface size and the wall thickness of the side wall define, at least partially, the magnitude of the force that is necessary for pressing the adjusting sleeve into the axial opening. Preferably, the side wall and/or the axial opening are substantially cylindrical, in particular substantially circular cylindrical.

More preferably, the side wall has at least one protrusion, in particular a plurality of protrusions. According to this aspect of the invention, an adjusting force which is necessary for pressing and/or displacing the adjusting sleeve in the axial opening is substantially defined by the plurality of protrusions, more precisely by their shape and number.

One aspect of the invention provides that at least one protrusion is formed as a rib, in particular wherein the rib extends over at least 25% of an axial extension of the side wall, preferably over at least 50%, more preferably over at least 60%. In this case, the each of the ribs are, viewed in a section perpendicular to the longitudinal direction of the adjusting sleeve, rounded, preferably convex. However, the ribs may also extend respectively over the entire axial length of the side wall.

In particular, the coupling device does not act upon the worm shaft with an axial force. In other words, the worm shaft is only acted upon by the spring element with the preloading force. As a result, less different components have to be considered when adjusting the preloading force, so that the adjustment of the preloading force is simplified.

BRIEF DESCRIPTION OF THE DRAWINGS

Further advantages and features of the invention will become apparent from the following description and the accompanying drawings, to which reference is made. In which are shown.

DETAILED DESCRIPTION

Figure 1:
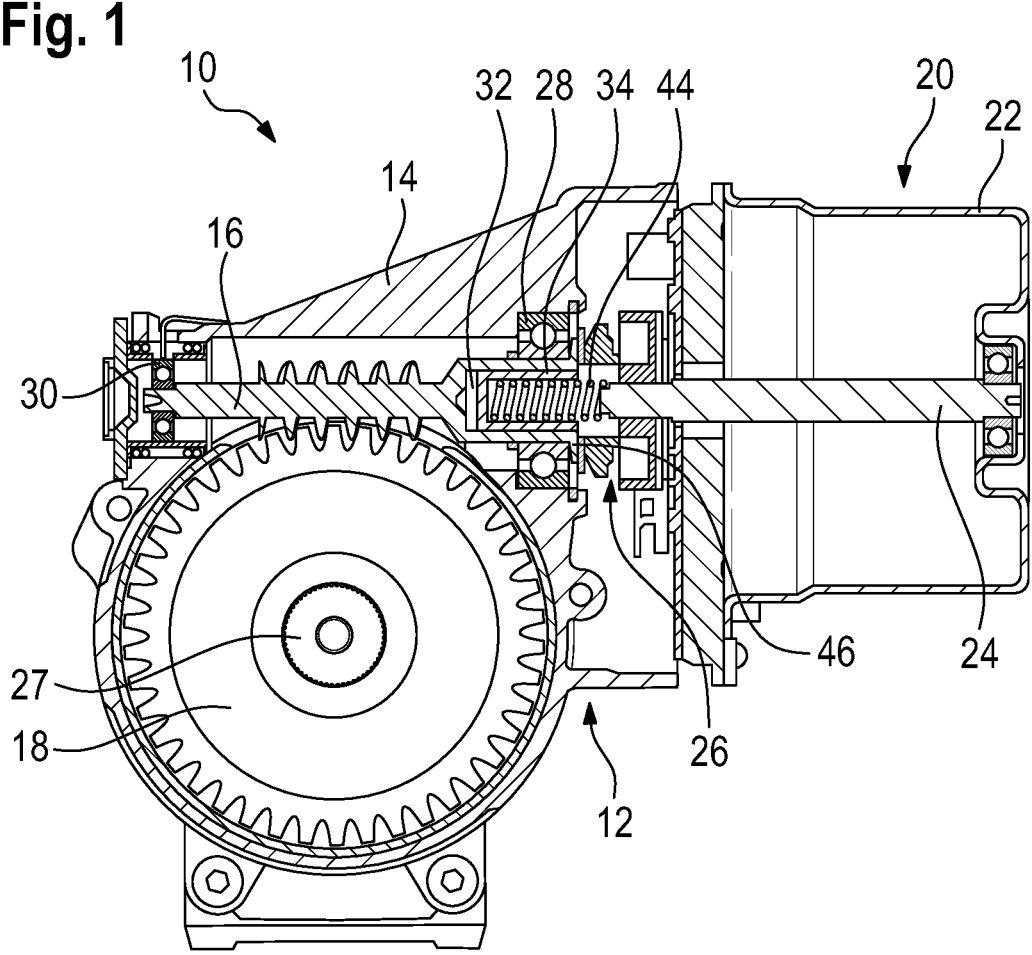
FIG. 1 shows schematically a cross section of an electric power steering system according to the invention.
Figure 2:
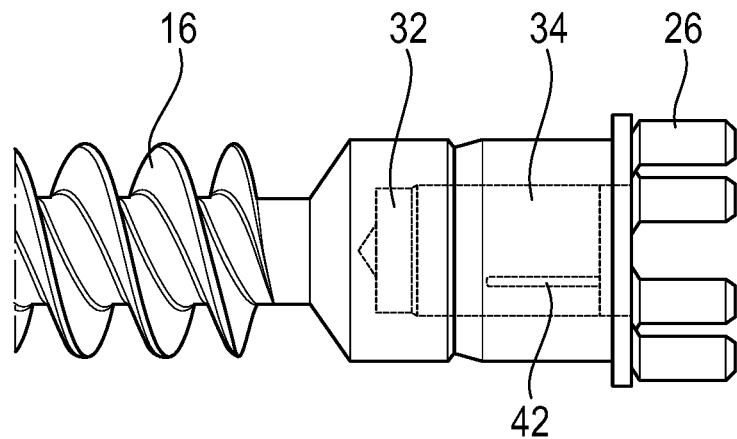
FIG. 2 shows a side view of an end portion of a worm shaft of the electric power steering system of FIG. 1 according to the invention.

FIG. 1 shows a schematic section of an electric power steering system 10, which comprises a worm gear 12 having a housing 14 in which a worm shaft 16 and a worm wheel 18 are housed, wherein the worm shaft 16 and the worm wheel 18 are in meshing engagement. Furthermore, the electric power steering system 10 comprises an electric motor 20 having a motor housing 22, and a drive shaft 24, which is rotatably connected to the worm shaft 16 via a coupling device 26.

The electric motor 20 includes an auxiliary force motor in the electric power steering system 10. An auxiliary force applied by the electric motor 20 is transmitted via the drive shaft 24 to the coupling device 26, from this to the worm shaft 16 and from this one again to the worm wheel 18, and then to a steering shaft 27.

In the embodiment shown in FIG. 1, the worm wheel 18 is rotatably connected to the steering shaft 27 of the electric power steering system 10. Then, the electric power steering system 10 is designed as a steering system with a steering column support (English: "EPS column drive"). However, for transmitting the torque, the electric motor 20 could not be connected via the worm gear 12 to the steering shaft 27 but to a pinion that is in the meshing engagement with a rack of the electric power steering system 10. The electric power steering system 10 has a single pinion drive or double pinion, which is also referred to in English as "pinion drive EPS" or "dual pinion EPS".

The worm shaft 16 is rotatably mounted on its end associated with the electric motor 20 by means of a fixed bearing 28, which is inserted into the housing 14 and is fixedly connected thereto. The fixed bearing 28 allows a limited pivoting movement of the worm shaft 16, but it prevents lateral movement of the worm shaft 16 parallel to its longitudinal axis. At its opposite end away from the electric motor 20, the worm shaft 16 is rotatably mounted by means of a floating bearing 30, which is pivotable to a limited degree together with the worm shaft 16. A maximum amplitude of the pivoting movement is chosen in a manner that the worm shaft 16 and the worm wheel 18 preferably cannot be disengaged.

Additionally, the worm shaft 16 at its end associated with the electric motor 20 has an axial opening 32, which from the axial end of the worm shaft 16 associated with the electric motor 20 extends into the worm shaft 16 in the axial direction of the worm shaft 16. The axial opening 32 has a substantially cylindrical shape, preferably a substantially circular cylindrical shape.

Figure 3:
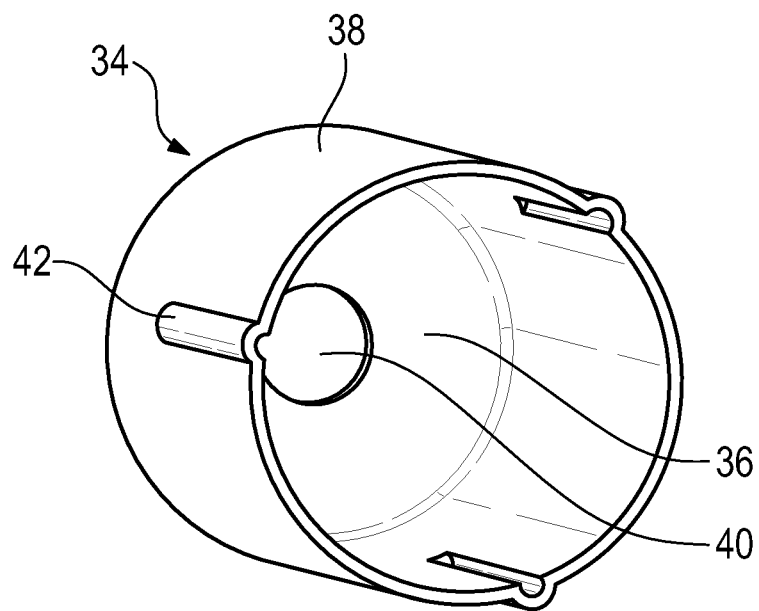
FIG. 3 shows an oblique view of an adjusting sleeve of the electric power steering system of FIG. 1 according to the invention.

In the axial opening 32, an adjusting sleeve 34 is pressed, which is shown in FIG. 3 in an oblique view. The adjusting sleeve 34 has an axial front wall 36, to the periphery of which a circumferentially closed side wall 38 is connected, which extends in the axial direction of the adjusting sleeve 34 perpendicular to the axial front wall 36. In the axial front wall 36, a passage opening 40 is provided, which has a circular cross-section, in the embodiment as shown in FIG. 3. However, the passage opening 40 may also have any other cross-section.

The side wall 38 is substantially formed complementary to the axial opening 32 in the worm shaft 16, and preferably rests against an inner wall of the axial opening 32, substantially against the entire surface. Thus, the side wall 38 is substantially cylindrical in shape, in particular substantially circular cylindrical. Also, the side wall 38 has a plurality of protrusions 42, which are each formed as a rib and extend in the axial direction of the adjusting sleeve 34 over a portion of the side wall 38. In this case, the ribs extend over at least 25% of the axial extent of the side wall 38, preferably over at least 50%, more preferably over at least 60%.

Between the drive shaft 24 and the axial front wall 36, a spring element 44 is inserted into the axial opening 32, more precisely into the adjusting sleeve 34. The spring element 44, at its axial end, is supported on one front side of the drive shaft 24 and at its other axial end, it is supported on the axial front wall 36 of the adjusting sleeve 34. Therefore, the spring element 44 acts upon the adjusting sleeve 34 with a spring force in the axial direction.

For example, the spring force is within the range from 200 N to 330 N, preferably in the range between 230 N and 300 N, more preferably in the range between 250 N and 280 N. However, there are other value ranges, since the tolerance range may depend on the type of a motor vehicle in which the electric power steering system 10 is to be installed.

The dimensions of the side wall 38 and the plurality of protrusions 42, more specifically, a radial diameter and a wall thickness of the axial front wall 36 and/or the side wall 38, are chosen in a manner that between the adjusting sleeve 34 and the inner wall of the axial opening 32, there is a press fit. An adjusting force necessary for pressing and/or displacing the adjusting sleeve 34 in the axial opening 32 is substantially defined by the plurality of protrusions 42, more precisely by their shape and number.

The adjusting force, which is necessary for pressing and/or displacing the adjusting sleeve 34 must be substantially greater than the spring force, so that the adjusting sleeve 34 is not accidentally adjusted by the spring force. For example, the adjusting force is at least 25% greater than the spring force, preferably at least 50%, more preferably at least 100%. For example, the adjusting force is in between 400 N and 600 N, preferably between 450 N and 550 N.

Accordingly, the spring force is transmitted from the adjusting sleeve 34 to the worm shaft 16 so that the spring element 44 acts upon the worm shaft 16 in the axial direction with a preloading force to produce the defined engagement conditions between the worm shaft 16 and the worm wheel 18.

In this case, the spring element 44 is the only component of the electric power steering system 10 that provides an axial preloading force to the worm shaft 16. In particular, the coupling device 26 does not act upon the worm shaft 16 with an axial force. Optionally, the worm shaft 16 at its end associated with the electric motor 20 has a radial widening 46 against which the fixed bearing 28 rests on one of its front sides, so that the spring force is also transmitted to the fixed bearing 28.

The radial widening 46 may be continuously formed in the circumferential direction, for example, as a circular ring. Alternatively, the radial widening 46 may have a plurality of radially extending tabs, starting from the worm shaft 16, which are connected to each other only via the worm shaft 16.

Then, the spring element 44 acts upon both the worm shaft 16 and the fixed bearing 28 respectively with an axial preloading force, so that both the worm shaft 16 and the fixed bearing 28 are held by the spring element 44 in the axial direction within a predetermined tolerance range. Accordingly, the preloading force of the electric power steering system 10 and each similar steering system must also be within a predetermined tolerance range.

The size of the spring force is dependent on the position of the adjusting sleeve 34 in the axial opening 32. Accordingly, the spring force can be adjusted by changing the position of the adjusting sleeve 34 within the axial opening 32, as a result of which the tolerances of the individual components may be compensated.

Figure 4:
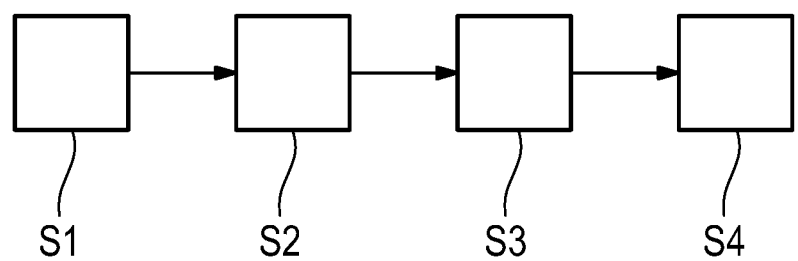
FIG. 4 shows schematically a sequence diagram of a process according to the invention for the production of an electric power steering system.

With reference to FIG. 4, a method for the production of electric power steering systems 10 is described below, which are identical in construction to the electric power steering system 10 described above. First, the individual relevant components of the electric power steering system 10 are measured (Step S1), in particular the worm shaft 16, the drive shaft 24, the housing 14 of the worm gear 12, the motor housing 22, and/or the spring element 44. Particularly relevant in this context are the dimensions of the individual components in the direction that coincides with the axial direction of the worm shaft 16 after assembling the electric power steering system 10.

From the calculated dimensions of the relevant components, a position, or better said, a depth is calculated, up to which the adjusting sleeve 34 is to be pressed into the axial opening 32 (Step S2). On the basis of the calculated dimensions of the components, the position is chosen in a manner that the spring force of the spring element 44 in the assembled state of the electric power steering system 10 falls within a predefined tolerance range. Then, the adjusting sleeve 34 is pressed up to the calculated position into the axial opening 32 (Step S3). For this purpose, as already explained above, due to the press fit between the adjusting sleeve 34 and the inner wall of the axial opening 32, a specific force is necessary, particularly, a force that substantially exceeds the later spring force and falls within, for example, the order of 500 N.

During the pressing, air located in an area between the axial front wall 36 and a floor of the axial opening 32 may escape through the passage opening 40. Finally, the spring element 44 is inserted into the adjusting sleeve 34 and the remaining electric power steering system 10 is assembled (Step S4).

Then, in steps S1 to S3, the dimensions of the respective components are determined individually for each electric power steering system 10 to be produced, a position for the adjusting sleeve 34 is calculated based on the dimensions, and the adjusting sleeve 34 is placed into the position that was calculated individually for the respective electric power steering system 10.

Accordingly, the tolerances of the individual components over the individual adjustment of the position of the adjusting sleeve 34 are compensated, in a manner that the preloading force in each produced electric power steering system 10 falls within the predefined tolerance range.

What is claimed is:

1. A method for the production of an electric power steering system, comprising the steps of:
    providing an electric motor having a drive shaft, and a worm gear having a worm shaft, wherein at an end of the worm shaft that is associated with the electric motor, the worm shaft has an axial opening;
    providing an adjusting sleeve and determining an axial position of the adjusting sleeve in the axial opening of the worm shaft in order to achieve a predetermined axial preloading force on the worm shaft;
    pressing the adjusting sleeve into the axial opening to the determined axial position, wherein there is a press fit between the adjusting sleeve and the worm shaft; and
    installing a spring element in the adjusting sleeve so that a first end of the spring element is supported axially on the drive shaft, a second end of the spring element is supported axially on the adjusting sleeve, and the spring element acts upon the worm shaft with the predetermined preloading force in the axial direction via the adjusting sleeve.

2. The method according to claim 1, wherein at least one of the worm shaft, the drive shaft, a housing of the worm gear, a motor housing of the electric motor and the spring element is measured to determine the axial position of the adjusting sleeve in the axial opening.

3. The method according to claim 1, wherein the adjusting sleeve is pressed up to the determined axial position into the axial opening before the electric motor is connected to the worm gear.

4. The electric power steering system according to claim 1, wherein rotation of the drive shaft about an axis of the drive shaft causes the worm shaft to rotate about an axis of the worm shaft.

5. An electric power steering system comprising an electric motor having a drive shaft, and a worm gear having a worm shaft,
    wherein at an end of the worm shaft that is associated with the electric motor, the worm shaft has an axial opening,
    wherein an adjusting sleeve is pressed into the axial opening and there is a press fit between the adjusting sleeve and the worm shaft, and
    wherein a spring element is provided, a first end of the spring element being supported axially on the drive shaft, a second end of the spring element being supported axially on the adjusting sleeve, wherein the spring element acts upon the worm shaft with a preloading force in the axial direction via the adjusting sleeve.

6. The electric power steering system according to claim 5, wherein the adjusting sleeve has an axial front wall on which the spring element is supported.

7. The electric power steering system according to claim 6, wherein the front wall has a passage opening.

8. The electric power steering system according to claim 6, wherein the front wall of the adjusting sleeve is pressed deeper into the axial opening than any other portion of the adjusting sleeve.

9. The electric power steering system according to claim 5, wherein the adjusting sleeve has a circumferentially closed side wall, which extends in the axial direction of the adjusting sleeve and rests against an inner wall of the axial opening.

10. The electric power steering system according to claim 9, wherein the side wall has at least one protrusion.

11. The electric power steering system according to claim 10, wherein the at least one protrusion is formed as a rib that extends over at least 25% of an axial extension of the side wall.

12. The electric power steering system according to claim 11, wherein the rib extends over at least 50% of the axial extension of the side wall.

13. The electric power steering system according to claim 5, further comprising a coupling device that connects the drive shaft to the worm shaft, wherein the coupling device does not act upon the worm shaft with an axial force.

14. The electric power steering system according to claim 5, wherein the worm shaft is in meshing engagement with a worm wheel.

15. The electric power steering system according to claim 5, wherein rotation of the drive shaft about an axis of the drive shaft causes the worm shaft to rotate about an axis of the worm shaft.

* * * * *